No. 671,154. Patented Apr. 2, 1901.
P. N. ANGSTEN.
PANORAMIC CAMERA.
(Application filed Aug. 11, 1899.)
(No Model.) 6 Sheets—Sheet 1.
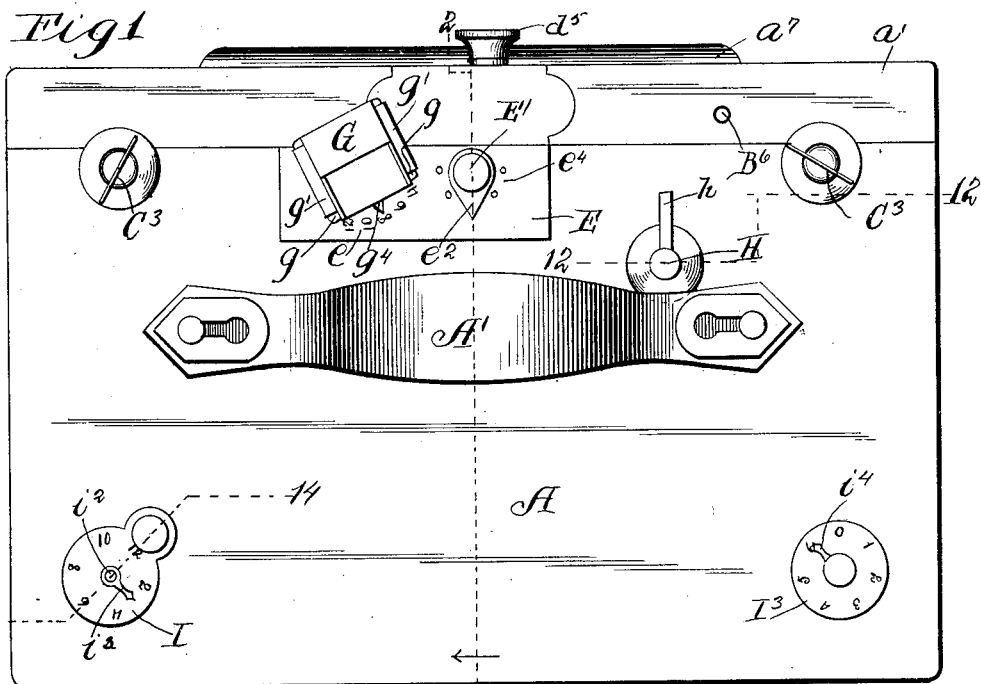
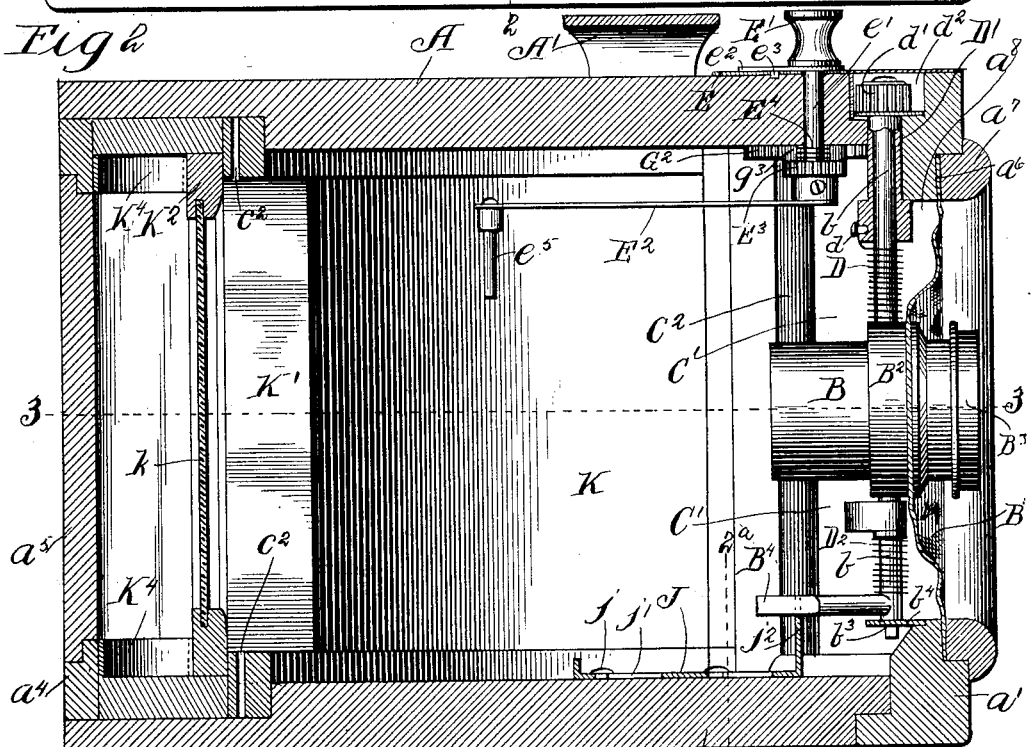
Witnesses:
Carl H. Crawford
William L. Hall
Inventor:
Peter N. Angsten
by Poole & Brown his Attys

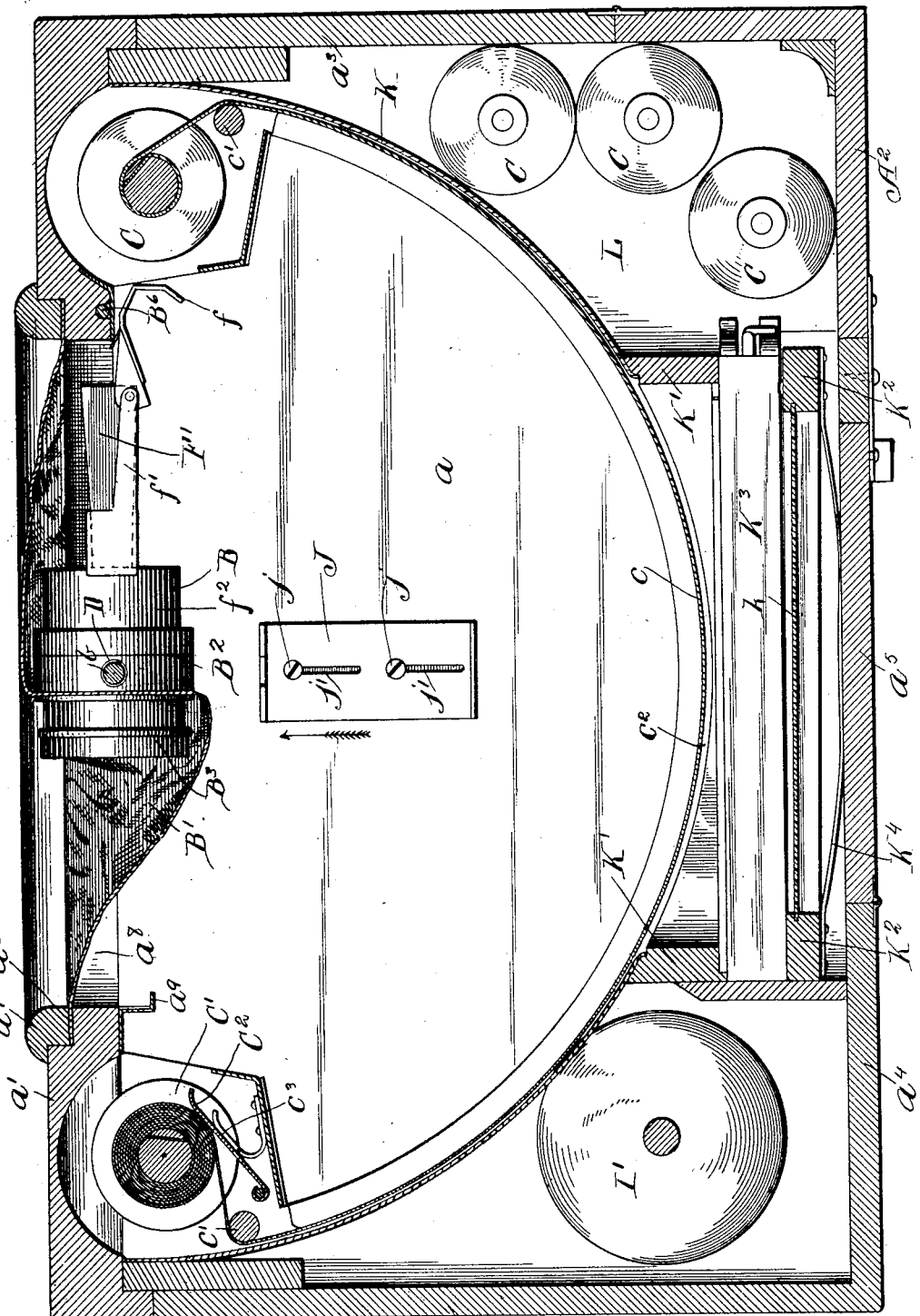

No. 671,154. Patented Apr. 2, 1901.
P. N. ANGSTEN.
PANORAMIC CAMERA.
(Application filed Aug. 11, 1899.)
(No Model.) 6 Sheets—Sheet 3.
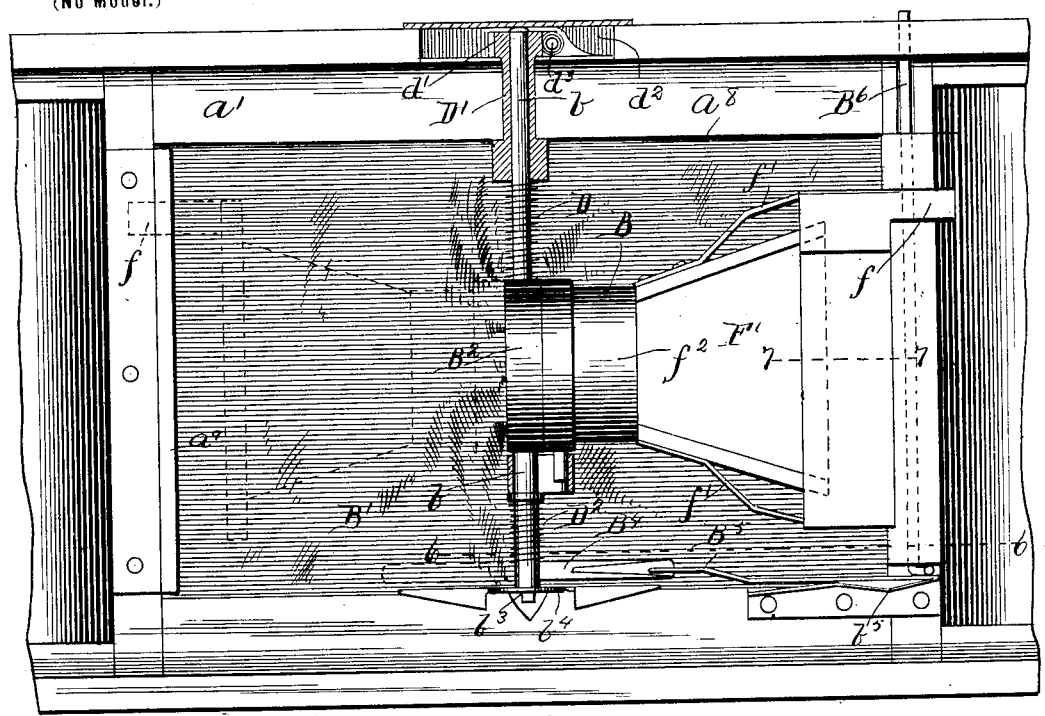
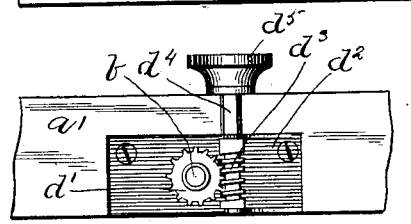
Fig 5.
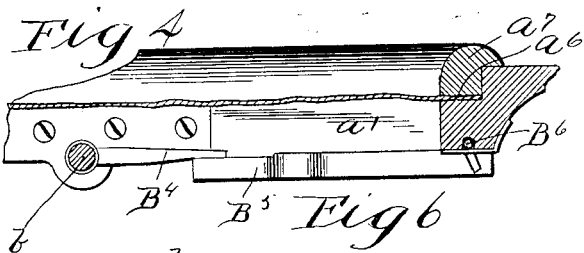
Fig 6.
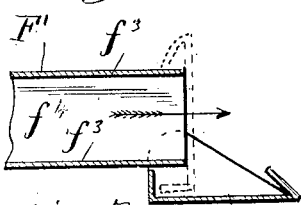
Fig 7.
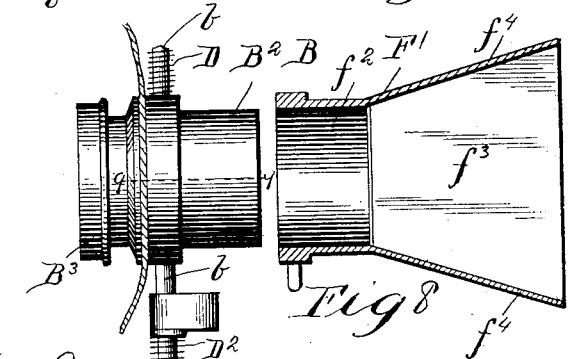
Fig 8.
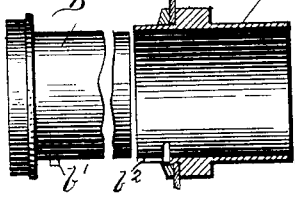
Fig 9.
Witnesses:-
Carl H. Crawford
William L. Hall
Inventor:-
Peter N. Angsten
by Poole & Brown
his Attys No. 671,154. Patented Apr. 2, 1901.
P. N. ANGSTEN.
PANORAMIC CAMERA.
(Application filed Aug. 11, 1899.)
(No Model.) 6 Sheets—Sheet 4.
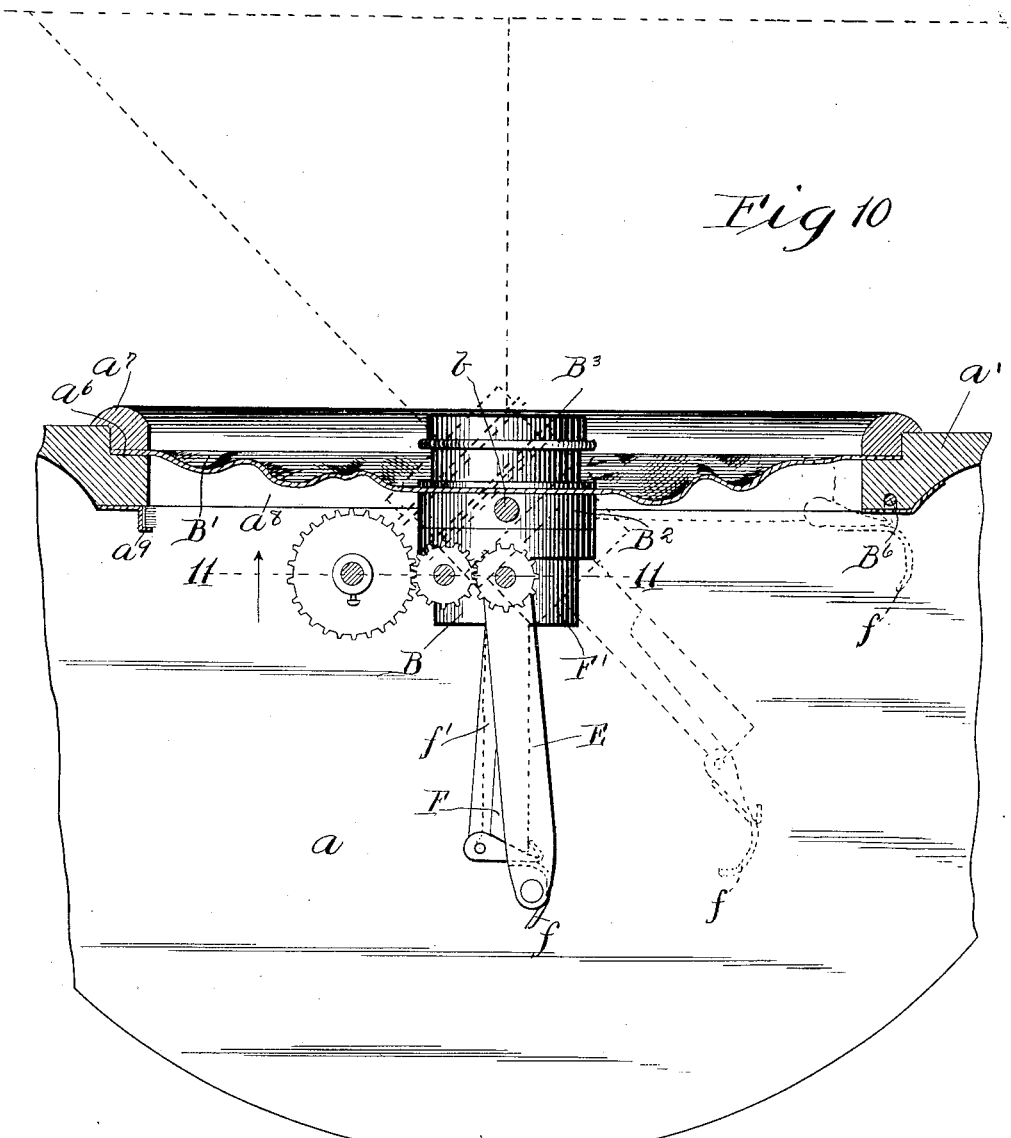
Fig 10
Fig 11
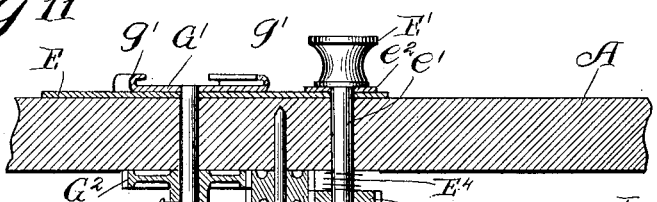
Witnesses:
Carl H. Crawford
William L. Hall
Inventor:
Peter N. Angsten
by Poole + Brown his Attys No. 671,154. Patented Apr. 2, 1901.
P. N. ANGSTEN
PANORAMIC CAMERA.
(Application filed Aug. 11, 1899.)
(No Model.) 6 Sheets—Sheet 5.
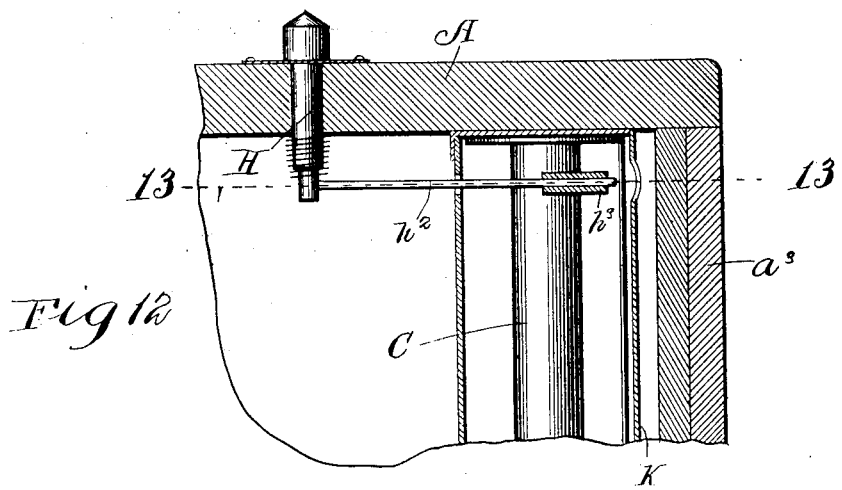
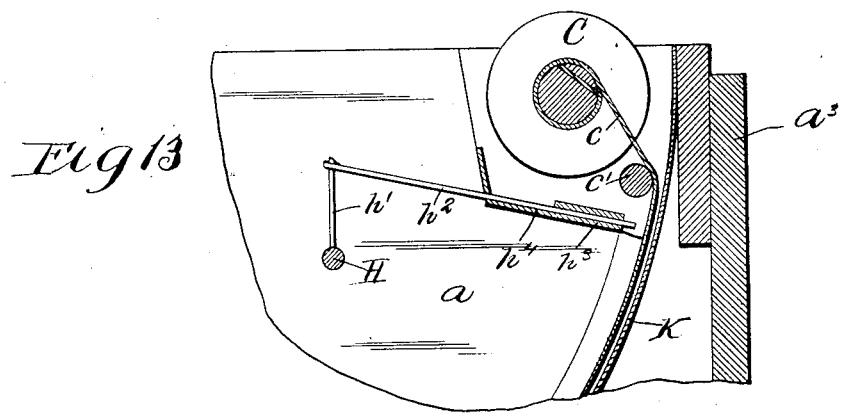
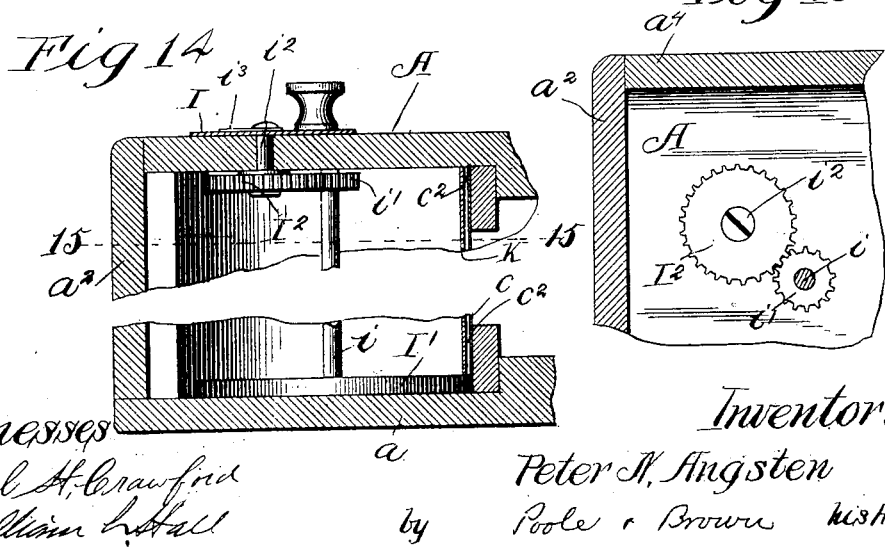
Witnesses
Carl H. Crawford
William L. Hall
Inventor:—
Peter N. Angsten
by Poole & Brown his Attys No. 671,154. Patented Apr. 2, 1901.
P. N. ANGSTEN.
PANORAMIC CAMERA.
(Application filed Aug. 11, 1899.)
(No Model.) 6 Sheets—Sheet 6.
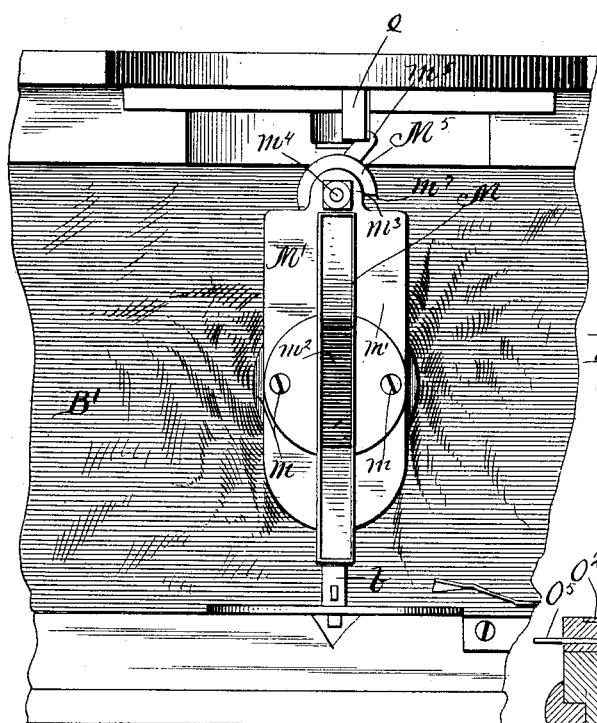
Fig 19
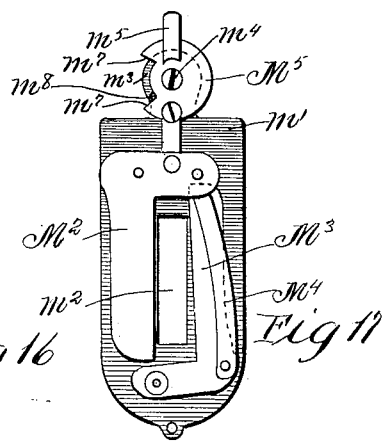
Fig 16
Fig 17
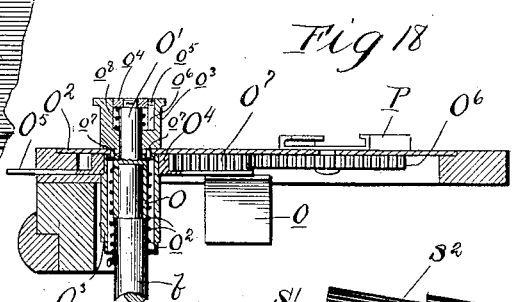
Fig 18
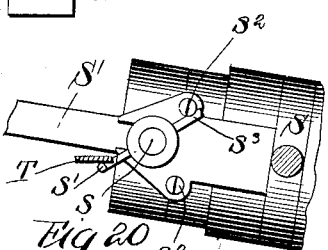
Fig 20
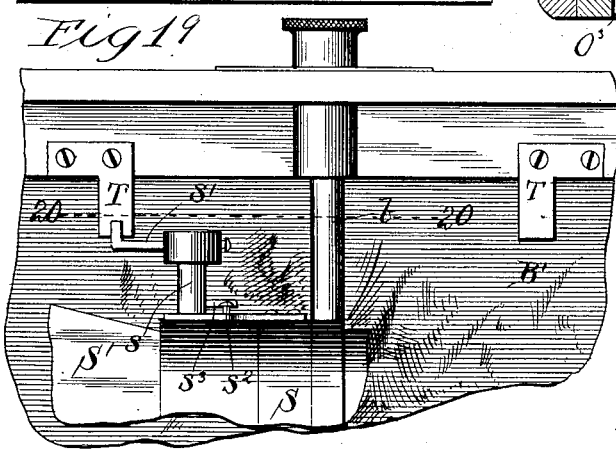
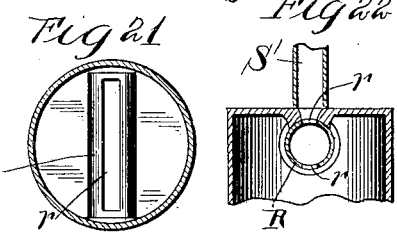
Fig 21
Fig 22
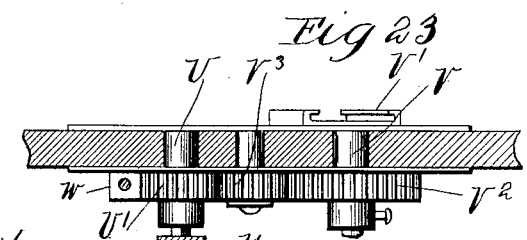
Fig 23
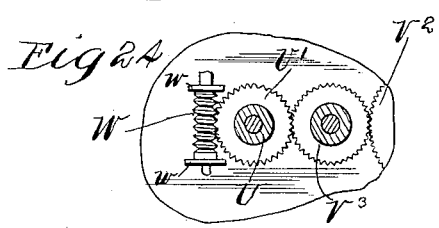
Fig 24
Witnesses:
C. H. Crawford
William L. Hall
Inventor:—
Peter N Angsten
by Poole & Brown his Attys

UNITED STATES PATENT OFFICE.

PETER N. ANGSTEN, OF BURLINGTON, WISCONSIN.

PANORAMIC CAMERA.

SPECIFICATION forming part of Letters Patent No. 671,154, dated April 2, 1901.

Application filed August 11, 1899. Serial No. 726,847. (No model.)

*To all whom it may concern:*

Be it known that I, PETER N. ANGSTEN, of Burlington, in the county of Racine and State of Wisconsin, have invented certain new and useful Improvements in Panoramic Cameras; and I do hereby declare that the following is a full, clear, and exact description thereof, reference being had to the accompanying drawings, and to the letters of reference marked thereon, which form a part of this specification.

This invention relates to cameras, and refers more particularly to that class of cameras, known as "panoramic cameras," wherein the film is held in a suitable holder within the camera-case and the lens is carried by a pivotally-mounted lens-holder which is spring-actuated, so that when released the lens will turn in the arc of a circle and expose a given amount of the film.

One of the objects of the present invention is to provide a panoramic camera with means for holding the swinging lens in a central position in order to expose a sensitized plate in lieu of a film and without increasing the focal length of the camera-case.

Another object of the invention is to provide means for automatically closing the lens-holder or shutting off the light at the desired time in the swing or movement thereof.

Another object of the invention is to produce a device for regulating the amount of film to be exposed for a picture and to regulate the extent of the throw or swing of the lens for that purpose.

Another object of the invention is to provide means for mounting a finder so as to move synchronously with said device for regulating the throw or swing of the lens, whereby the finder will locate only such portion of the landscape or picture as it is desired to take, and thereby facilitating the work of the photographer.

Another object of the invention is to provide a punch whereby may be indicated on the film the dividing-line between portions thereof that have been subjected to different exposures.

Another object of the invention is to provide a suitable friction device upon the receiving-film spool or holder to keep the film in proper position in its guide or way, and which friction device shall not tear, scratch, or otherwise injure the film.

Yet another object of the invention is to provide upon the outside of the case a suitable indicator so connected with the case that it will be operated synchronously with the receiving-film spool or holder, whereby to indicate precisely how much of a film has been exposed or has passed the exposed field and been rolled up in said receiving-spool.

Another object is to combine in one camera a revoluble or swing lens and means for focusing said lens when and for a fixed or set exposure.

All these and other objects of my present invention will be more fully understood by examining the accompanying drawings and subjoined description thereof and will be more fully pointed out in the appended claims.

While I have illustrated herein one practical embodiment of my invention, I do not desire to be limited to the precise details of construction set forth, since many modifications thereof may be used without departing from the spirit of my invention. I desire, therefore, my claims to be considered and to be construed broadly to include all such modifications.

In said drawings, Figure 1 is a top or plan view of the outside of a camera embodying my present invention. Fig. 2 is a transverse vertical sectional view of the same, enlarged, taken upon the line 2 2 of Fig. 1, the lens being centrally fixed and the film removed, whereby a set picture may be taken on a plate. Fig. 2$^a$ is a detail of the lens-locking device when plates are used in lieu of a film-strip, taken on line 2$^a$ 2$^a$ of Fig. 2. Fig. 3 is a horizontal sectional view taken on line 3 3 of Fig. 2, but with the film-strip in position. Fig. 4 is an elevation showing the inside of a portion of the front of the camera, the view being taken in the direction indicated by the arrow in Fig. 3 to illustrate in full lines the initial and in dotted lines the final position of the lens-holder in taking a panoramic picture. Fig. 5 is a detail view showing the device for adjusting the tension of the spring that actuates the revoluble spindle on which the lens-holder is mounted. Fig. 6 is a sectional view showing in plan view the lens locking and releasing device. Fig.

7 is a horizontal sectional view taken on line 7 7 of Fig. 4, showing two positions of the pivotal shutter on the end of the lens-holder. Fig. 8 is a detail showing the lens-holder and the removable cone-like section, the latter being in section. Fig. 9 is a detail showing the two parts of the lens-holder slightly separated. Fig. 10 is a horizontal sectional view, taken immediately below the top plate of the camera-case, of a portion of the case, illustrating more fully the mechanism for regulating the amount of movement of the swinging lens-holder. Fig. 11 is a vertical sectional view taken on line 11 11 of Fig. 10, showing the train of gears for actuating the finder synchronously with the lens-regulator. Fig. 12 is a vertical sectional view of a portion of the camera-case, showing the film-punch, taken on line 12 12 of Fig. 1. Fig. 13 is a horizontal sectional view of the same, taken on line 13 13 of Fig. 12. Fig. 14 is a vertical sectional view, broken away, showing the top and bottom of that portion of the case wherein is located the friction-disk and the film-recording dial, taken on line 14 14 of Fig. 1. Fig. 15 is an inside or bottom view of the under side of said top portion, showing the gears by which the index-finger of said dial is actuated by the movement of the film through the friction-disk and its spindle, taken on line 15 15 of Fig. 14. Fig. 16 is a rear elevation of a lens-holder, showing another form of shutter applied thereto, said holder being in its intermediate position. Fig. 17 is a front elevation of the rear section of the lens-holder, showing more clearly the construction of the shutter mechanism. Fig. 18 is a section through another form of stop for the lens-holder and its connection with the supporting-plate. Fig. 19 is a fragmentary rear elevation of a lens-holder, showing still another form of shutter applied thereto, said lens-holder being at the limit of its movement. Fig. 20 is a horizontal section taken on line 20 20 of Fig. 19. Fig. 21 is a cross-section through the lens-holder, showing the construction of the shutter. Fig. 22 is a cross-section through said shutter. Figs. 23 and 24 illustrate another means for actuating the movable stop and finder-supporting plate, said construction being a modification of that shown in Fig. 11.

In the drawings, A represents the top wall of the camera case or frame; A', the handle thereof; $a$, the bottom wall; $a'$, the front wall; $a^2$ $a^3$, the two end walls; and $a^4$ the back wall of said case. In the back wall $a^4$ is a hinged door $a^5$, to permit access to the interior of the case. An angle-door $A^2$, hinged to the end wall $a^3$, affords access to one corner of the case for a purpose hereinafter stated. Said doors are fastened by a common clasp, as shown in Fig. 3.

B represents the lens-holder as a whole, which is pivotally mounted upon oppositely-directed spindles $b$, as herein shown. The lens-holder B projects through a suitable opening in a flexible front B' of the cloth or other suitable material, the margins of which are secured between a shoulder $a^6$ upon the front wall $a'$ and a molding $a^7$, said shoulder $a^6$ terminating and marking the margin of an opening $a^8$ through the front wall $a'$, which, but for the flexible front B', would permit free access to the interior of the camera-case.

C is a spool revolubly mounted in a familiar manner in the front right-hand corner of the box, as shown in Fig. 3, and upon which is wound any suitable or desirable quantity of sensitized film $c$. Another spool C' is similarly mounted in the corresponding opposite corner of the box, as shown in Fig. 3, and the film is passed from one spool to the other in the manner hereinafter described, first passing over rollers $c'$, positioned near the spools C C'. A curved groove extends from one spool to the other, the axis of the lens-holder spindles $b$ being the center of the circle. Said groove is lettered $c^2$ in the drawings and is formed not only in the lower or bottom wall $a$, but in the upper or top wall A. Said grooves $c^2$ are herein shown as formed between separate curved pieces attached to said upper and lower walls. The means of supporting and driving the film-strip forms no part of the present invention, and being readily comprehended from the drawings, Figs. 2 and 3, will not be herein further referred to. It has been found, however, that in passing the film from one spindle to another the film is likely to be scratched or otherwise injured, and to prevent this I train the film over antifriction-rollers $c'$, as before stated.

$C^2$ designates a spring-pressed pivot-plate, which, acting under the influence of a spring $c^3$, presses against the film-strip upon the spool C' and maintains a proper tension upon the film. By this simple arrangement I find that the film-strip is wound and unwound and passed from one spool to the other without any injury whatever.

I will now refer more particularly to Figs. 2, 3, 4, 5, 6, and 10 in describing the means for swinging the lens-holder, for stopping it in any desired point in its movement, and for automatically closing the interior shutter at the desired time in the movement thereof. It will be understood that if a maximum exposure of film is to be made—call it, for example, twelve inches—the lens-holder B will be swung upon its spindle $b$ into a position opposite that shown in Figs. 3 and 4, or through an arc of approximately one hundred and eighty degrees, while if an exposure is desired of, say, six inches, or one-half the maximum, the lens-holder will be swung from the position illustrated in Fig. 3 to that illustrated in Fig. 10. The said spindles $b$ are attached to the central tubular section $B^2$ of the lens-holder and to which the flexible closure B' is secured. Telescoping within said tubular section $B^2$ is the front section of the holder $B^3$. Said section $B^3$ is provided with a radially-projecting pin $b'$, which latter is adapted to enter and engage an L-shaped angle or bayonet-catch slot $b^2$, extending inwardly from the front margin or edge of the tubular member $B^2$. By means of this connection the outer section $B^3$ and the central section $B^2$ are removably locked together when the camera is to be used as a panoramic camera. When it is desired to expose a plate instead of a film the lens may be focused by first rotating the section $B^3$ until the pin $b'$ is opposite the longitudinal portion of the slot $b^2$ and then sliding said section inwardly or outwardly, as required, the telescoping parts fitting with a reasonable amount of friction for this purpose. When the camera is to be used as an ordinary camera, the innermost section $F'$, which has sliding detachable engagement with the central section of said holder, may be removed and an outer section carrying the usual automatic or quick-action shutter, and a different lens, if desired, substituted for the outer section $B^3$.

Around the upper one of the spindles $b$ is a spring D, the lower end of which is fixed to the central section $B^2$ of the lens-holder, and the upper end of which is secured at $d$, to a rotative sleeve $D'$, with which the upper end of the spindle $b$ has rotative engagement. To the upper end of this sleeve $D'$ is a fixed gear $d'$, herein shown as made integral with the sleeve and located in a suitable recess $d^2$ in the top wall A. Said pinion meshes with a worm-gear $d^3$ upon a spindle $d^4$, that projects laterally outwardly to the front of the camera-box and is provided outside of the box with a thumb-piece $d^5$. Said spindle acts when rotated to rotate the sleeve and vary the tension of the spring D, and thereby vary the time required to swing the lens from its initial to its final position and increase or decrease the time of exposure, as conditions may require. The lower spindle $b$ has bearing at $b^3$ in a suitable projection $b^4$, projecting inwardly from the front wall $a'$ of the box, and said lower spindle is provided with a projecting arm $B^4$, which arm engages the end of a spring-pressed lever $B^5$, as more clearly shown in Fig. 4, and by which it is held in its normal or initial position. Extending upwardly and through the wall of the box is a pin $B^6$, the lower end of which engages the other end of the lever $B^5$. A spring $b^5$ presses upwardly against the under side of the lever $B^5$, so that said lever is normally in the substantially horizontal position indicated in Fig. 4. Downward pressure on the rod B depresses the adjacent end of the lever $B^5$ and raises the opposite end, and thereby releases the engagement of the lever $B^5$ with the arm $B^4$, so that the lens-holder may swing on its pivot under the influence of its actuating-spring. An auxiliary spring $D^2$ surrounds the lower spindle of the spindle $b$ and acts upon the lens-holder as does the spring D, but is not provided with any device for adjusting its tension.

The amount of swing or throw of the lens-holder in order to expose the desired amount of film-surface is regulated by the following mechanism: Upon the top of the box is a plate E, having a suitable index or graduated surface $e$, indicating the different positions at which the holder-stop may be located. $E'$ is a handle attached to a spindle $e'$, the latter of which is longitudinally movable through a suitable opening or bearing in the top wall of the camera-box. Secured to the handle $E'$ or the spindle $e'$ is an index-finger or pointer $e^2$, carrying on its under side a small locking-pin $e^3$, which latter is adapted for engagement with locking-holes $e^4$ in the plate E, arranged concentrically to the axis of the spindle $e'$ and at the desired intervals. Secured to the lower end of the spindle $e'$ is a stop-arm $E^2$, the inner end of which carries a downwardly-projecting lug or pin $e^5$. A pinion $E^3$ is secured to the spindle $e'$, above the arm $E^2$, and a suitable spiral spring $E^4$ is interposed between the lower or under side of the top wall of the box and said pinion $E^3$ and arranged to exert a downward pressure on the spindle and move said pin $e^3$ into the aperture $e^4$ and lock the stop-arm in any desired position. If the arm $E^2$ be set for any given amount of surface of film-exposure—say eight inches—and it is desired to set it for, say, four inches of exposure, the handle $E'$ is raised against the action of the spring $E^4$ and then rotated until the index $e^2$ points to the number on the graduated plate E, and upon the handle $E'$ being released the spring will force the locking-pin $e^3$ into that one of the locking-holes $e^4$ which corresponds with the desired number on the graduated plate.

The downwardly-projecting pin or stud $e^5$ is adapted for engagement with a projection $f$ on a swinging shutter F, which latter is pivotally mounted upon suitable arms $f'$, secured to the inner section $F'$ of the lens-holder. Said inner section, as shown more fully in Figs. 3, 4, and 8, consists of a tubular cylindric part $f^2$, adapted for telescopic engagement with the inner portion of the central section $B^2$ of the lens-holder, to which tubular part $f^2$ is secured a part having approximately parallel side walls $f^3$ and flaring end walls $f^4$. The shutter F is so pivoted upon the inner section $F'$ that when it is swung backwardly, as indicated in Fig. 7, the rays of light may pass from the exterior of the camera and through the holder into the interior of the box to the film in the direction indicated by the arrow in Fig. 7. When said shutter F is swung to the position indicated by dotted lines in Fig. 7, it will completely close the opening in the holder and shut off all light to the camera. When the lens is in its normal position, as indicated in full lines in Figs. 3 and 4, the shutter F will be opened by reason of the fact that its outer or swinging end $f^5$ will be engaged by the margin of the wall $a'$, surrounding the opening therein. When the lens is swung around on its spindle to the end of its maximum throw, the arm thereof will engage a projection $a^9$ on the inner side of the front wall of the box and swing the shutter to its closing position, the stop-arm being at this time swung out of the way of said shutter-arm. When said stop-arm is set to stop said holder at an intermediate position, the projecting stud or pin $e^5$ will engage said shutter-arm and swing the shutter to its closing position. When the shutter is closed, the engagement of the arm thereof with said pin $e^5$ serves to arrest the movement of the lens-holder. Thus the pin $e^5$ serves the double purpose of arresting the swinging lens-holder and also of closing the shutter at the proper time. So far as the closing of the shutter intermediate the limits of movement of the holder is concerned it may obviously be effected without arresting the movement of the lens-holder, and said lens-holder may at each operation of the camera swing through its maximum throw.

A familiar implement, known as a "finder," has heretofore been used upon cameras. I have indicated such a device by the letter G in Fig. 1, but will not describe its mechanism in detail. Suffice it to say that such a finder is removably secured to my camera by means of flanges $g$, engaging guide-grooves $g'$, formed by turning up the margins of a rotative plate G'. Said plate G' is mounted upon a spindle $g^2$, passing through the top wall of the camera-box and carrying upon its lower inner end a gear-wheel $G^2$. Motion is communicated to said gear-wheel $G^2$ from the pinion $E^3$, connected with the stop-arm spindle, through an intermediate gear-pinion $g^3$, rotatably secured, as shown in Fig. 11, or in any other suitable manner, to the inside of the top wall of the box. Inasmuch as the spindle $e'$, on which the pinion $E^3$ is mounted, is provided with a longitudinal movement, it will be desirable to make said intermediate pinion $g^3$ of double the width of the pinion $E^3$, so that the tooth of the latter will at all times be in engagement with the tooth of the pinion $g^3$. Upon the other end of the dial-plate E or a similar graduated plate is provided a second series of numbers corresponding with those shown at $e$, and an index finger or pointer $g^4$ extends outwardly from the plate G' and coöperates with said numbers in a familiar manner. From this construction it will be manifest that when the handle E of the stop-arm spindle is turned one way or the other, so as to bring the pin or stud $e^5$ of said arm into position for a given amount of exposure, the finder G will be automatically turned at an angle suitable for indicating the same amount of landscape, thus greatly facilitating the taking of an accurate picture.

In using a continuous film in a camera it becomes desirable to indicate on the film the dividing-line between the different exposures in order that the film may be severed on such line in the dark or developing room. This is accomplished in my camera by means of a reciprocating punch which makes a small aperture in one edge of the film. The mechanism is illustrated more clearly in Figs. 1, 12, and 13. Referring thereto, H designates a rotative spindle extending vertically through the top wall of the camera-box, to the upper end of which is secured a handle $h$, by which the spindle may be rotated from outside the box. To the lower end of the spindle H is rigidly secured an arm $h'$, connected at its outer or free end with a reciprocating bar $h^2$, which has a bearing at $h^3$ in an interior casing $h^4$, which surrounds one of the film-spools C and extends at its inner end closely adjacent to the film-strip just outside of the roller $c'$, adjacent to the spool C. The forward end of the bar $h^2$ is either suitably sharpened or provided with a cutter or punch, so that when the spindle H is partially rotated longitudinal movement will be given to the bar $h^2$ and a hole or aperture punched or cut through the upper edge of the film $c$. Preferably this aperture will be made in that portion of the margin of the film that engages the upper guide-groove $c^2$, so that it will not in any way interfere with the field—namely, that portion of the film that has been exposed.

The spindles of the spools C C', upon which the film $c$ is wound, project through the upper wall of the camera-box and are provided with thumb-pieces $C^3$, as shown in Fig. 1, by which they may be rotated and the film unwound from one and wound upon the other spool. In order to determine just how far to wind the film after or before an exposure of a given amount of film, I provide an automatic index device, as shown in Figs. 1, 14, and 15. Such index device consists of a graduated plate I, which corresponds to the plate E. Within the camera-case and at the rear left-hand corner, Fig. 3, is located a friction-wheel I', so arranged as to extend slightly into the lower guide-groove $c^2$, and thus be in contact with the lower margin of the film $c$, so that movement of the film will rotate said friction-wheel. Said wheel I' is connected with a shaft or spindle $i$, which latter extends upwardly and has bearing at its upper end in the top wall of the camera-box. Said spindle $i$ carries on its upper end a pinion $i'$, which meshes with a gear-wheel $I^2$, mounted upon the lower end of the spindle $i^2$. Said spindle $i^2$ extends upwardly through the top wall of the box and through the index-plate I and is provided on its outer end with an index-finger $i^3$. Said plate I will be graduated to indicate inches and fractions of inches, and the disk I' and pinion and wheel $I^2$, respectively, will be so proportioned as to move the index-finger $i^3$ from one index-mark to another when a given point on the film passes through a distance of one inch. It will be seen, therefore, that by reference to the graduated plate E after the stop-arm has been adjusted the proper amount of film may be accurately and readily wound from one spool to the other, as the index-finger connected with said stop-arm will indicate the length of film to be used, and the index-finger $i^3$ will indicate when the proper amount of film has been wound off of one spool and onto the other.

As a matter of convenience merely I locate upon the top right-hand corner of the rear end of the camera-box, as shown in Fig. 1, an index-finger $i^4$, which is adapted for manual operation each time a picture is taken, the idea being that upon its dial $I^3$ may be kept a record of the total amount of film-exposures made from time to time, so that the operator can tell at a glance, knowing how much film he ought to start with, the precise amount of unexposed film left in his camera and available for use, if any.

One of the objects of my invention, as before stated, is to provide means whereby an ordinary sensitized plate may be exposed as well as a film. For the purpose it will be necessary to locate the lens-holder B in a fixed position, preferably in a central position, as shown in Fig. 2. This is accomplished by first moving the stop-arm $E^2$ entirely out of the way, and then, having disengaged the arm $B^4$ from the spring-pressed lever $B^5$ by bringing the lens into the position indicated in said Fig. 2 or other desired position, the lens-holder is then locked in such position by moving forward a slide J in the lower part of the camera-box into engagement with the arm $B^4$ of said holder. This slide J is movably secured to the bottom wall $a$ of the box by screws $j$, passing through suitable slots $j'$ in said slide. The guide J is provided with an upturned arm $j^2$, having a slot in its upper margin $j^3$. It is in this slot $j^3$ that the end of the arm $B^4$ is located when the lens holder B is in its central position, as indicated in Fig. 2. The inner section $F'$ of the lens-holder B is at this time removed from the central section $B^2$ and the outer section $B^3$ focused in the manner before described or another section having a different lens and a quick-acting shutter substituted therefor, as desired. The film $c$ is also entirely removed.

The construction of the box is such as to provide a curved film-support K in the rear part thereof, as shown in Fig. 3, which support forms really the back of the guide-groove $c^2$. This support K is cut away in its part opposite to the lens to provide a space of suitable size for the plate to be exposed. In rear of said central opening is a suitable frame $K'$. In the rear of said frame $K'$ is provided a second frame $K^2$, between which and the frame $K'$ is a plate-holder $K^3$. Said frame $K^2$ is a movable frame and is provided with flat springs $K^4$, which tend to keep the frame in the position indicated in Fig. 2—to wit, to its position nearest the lens. The door $a^5$ being opened, the picture is presented upon a ground glass $k$, secured in the movable frame $K^2$, and the lens B is focused accordingly. The plate-holder will be inserted into place and removed therefrom through the angle-door $A^2$. When the plate-holder $K^3$ is removed, the spring $K^4$ will cause the frame $K^2$ to move forward into its normal position, as indicated in Fig. 2.

The space L at the right-hand portion of the camera-box, located between the support K and the side $a^3$ and closed by the door $A^2$, may be used as a magazine and will be convenient for the purpose of storing several film-spools C. Of course before inserting or removing the plate-holder $K^3$ it will be necessary to temporarily remove one or more of the spools C from the magazine L.

The shutter instead of being located at the rear end of the lens-holder may be located between the inner and intermediate sections thereof, as shown in Figs. 16 and 17. Said figures also illustrate a modified form of shutter. As herein shown, M indicates the flaring inner section of the lens-holder, which is attached by screws $m$ to the intermediate section $M'$, said inner section being provided with a flange $m'$, which is adapted to engage a similar flange on the inner end of the intermediate section, and between which flanges the shutter is located. Said inner section is provided with an opening $m^2$, through which the light passes when said opening is unobstructed. $M^2$ $M^3$ designate L-shaped shutter members which are pivoted to the flange $m'$, on the opposite sides of the opening therein. The shutter member $M^2$ is pivoted at its angle near one end of the opening and has its longer arm normally outside of and substantially parallel with one side margin of said opening, while the other shutter member is pivoted at the end of its shorter arm near the opposite end of said opening and with its longer arm normally outside of and substantially parallel with the other side margin of such opening. A link $M^4$ is pivoted at one end to the shorter arm of the member $M^2$ and at its other end to the angle of the other arm. $M^5$ designates a lever having the form of an annular plate or disk, as herein shown, which is pivoted to an extension $m^3$ at the upper end of the flange $m'$ by means of a pivot-pin $m^4$. Said plate or lever is provided with a lug $m^5$, which projects into the path of a stop $o$, which corresponds in function to the stop shown in the previously-described figures. Said lever $M^5$ is connected with the shorter arm of the shutter member $M^2$ by a link $m^6$, which is pivoted at its opposite ends to said lever and arm. The annular plate or lever $M^5$ is cut away on one side to provide two stop-surfaces $m^7$ $m^7$, which are adapted for engagement with a stop-pin $m^8$ on the projection $m^3$ and by means of which movement of said lever is limited in both directions. With this construction when the projection $m^5$ engages the stop $o$ in the movement of the lens-holder it will act, through the action described, to move said shutter members together in an overlapping relation, and thereby prevent the light from passing through the opening $m^2$. Suitable stops may be provided for engagement with the lug at either limit of the holder's movement.

In Figs. 16 and 18 is shown a modification of the adjustable stop for limiting the movement of the lens-holder and the means for actuating the same. As shown in said figures, the upper lens-holder spindle $b$ fits at its upper end within a sleeve O, which is attached to the lower end of a spindle O', which has bearing in a plate $O^2$, attached to the upper wall of the box and projects outside of said box. $O^3$ designates a sleeve which surrounds said sleeve O and the spindle $b$ and which is of greater internal diameter than the external diameter of the spindle $b$ and sleeve O. Said sleeve is attached in any convenient manner rigidly to the under side of the plate $O^2$. $O^4$ designates a pinion which is rotatively mounted on a reduced portion of said sleeve which is inside of the plate $O^2$. $O^5$ designates a disk rigidly attached to the said pinion and which also has rotative bearing on said reduced portion of said sleeve $O^3$. Said disk corresponds with the stop-lever of the previously-described figures and is provided with the stop lug or projection $o$, which extends into the path of the lug $m^5$. P designates a finder-supporting plate located on the upper surface of the plate $O^2$. Said plate is attached to and rotates with a gear-wheel $O^6$ by means of a pin $o'$, which has rotative bearing in said plate $O^2$. $O^7$ designates an intermediate pinion or idler located between said pinion $O^4$ and the gear-wheel $O^6$, rotatively mounted on a suitable pin (not shown) attached to said plate $O^2$. $o^2$ designates a spring surrounding the said spindle $b$ and the sleeve O and between the latter and the sleeve $O^3$, said spring being attached at one end to the said sleeve O and at its other end to the spindle $b$, whereby the tension of the spring may be varied by turning said sleeve with reference to the spindle. Means for turning said sleeve and adjusting the tension of said spring consists of a thimble $o^3$, which fits over the portion of the outer end of the spindle O' which projects beyond the plate $O^2$. Said thimble is connected with the spindle by means of a nut $o^4$, which has screw-threaded engagement with the extreme end of the spindle and fits within the upper end of the thimble, said nut being provided with a lug $o^5$, which engages an internal groove $o^6$ in said thimble, whereby when the thimble is turned it will act through the nut to turn the said spindle, and thereby vary the tension of the spring $o^2$. Said thimble is locked in place by means of pins $o^7$, attached to the inner end thereof and adapted to engage apertures in the upper or adjacent face of the plate. Said pins are held normally in engagement with said apertures by means of a spring $o^8$, which is interposed between the nut $o^4$ and an internal shoulder in the thimble $o^3$. The provision of the slot or groove $o^6$ in the thimble engaged by the lug $o^5$ permits said thimble to be lifted to disengage said pins $o^7$ from the apertures in the plate $o^2$, at which time said thimble and spindle will be free to be rotated. This construction has the advantage of compactness, as it enables the disk $O^5$ (which is in effect a lever) to swing on an axis of oscillation coincident with the lens-holder spindle.

Next describing the construction of the shutter shown in Figs. 19, 20, 21, and 22, these parts are made as follows: The lens-holder is made substantially as that shown in Fig. 4, being rotatively mounted on the spindle $b$, which has bearing in the upper wall of the box or inclosure. The shutter consists of a tubular section R, which is rotatively mounted in the inner section of the holder in a vertical position just inside of the contracted opening of the flaring portion S' of the holder S. Said tubular section is provided with a spindle $s$, which projects outside of the holder, and which spindle is provided at its outer end with an arm $s'$, which is adapted for engagement with stops T T, connected with the upper wall of the box or inclosure at either limit of the movement of the lens-holder and which is also adapted for engagement with an adjustable stop of any of the forms shown intermediate its limits of movement. Said shutter is provided with oppositely-arranged longitudinal openings $r$, as shown more clearly in Fig. 22, which when turned opposite to the contracted opening in the flaring portion S of the lens-holder permits light to pass therethrough. The walls of said shutter on each side of said opening $r$ are imperforate, so that when said shutter is turned to bring said openings out of line with the opening in the lens-holder the imperforate walls of the shutter will exclude light from the interior of the camera through said holder. Stop-pins $s^2$ $s^2$ are provided on the upper face of the lens-holder and are adapted to engage a stop-arm $s^3$ on the spindle $s$ and serve to limit the rotation of said shutter in both directions. It will be understood that the shutter will be in position to permit passage of light through the lens-holder when the stop-arm $s^3$ is in engagement with one of the stop-pins $s^2$ and to exclude light from said holder when said stop-arm is in engagement with the other stop-pin. The construction or arrangement of the parts is such that the shutter will be rotated to exclude the light when the lens has reached the limit of its movement or is arrested in an intermediate position.

Next referring to the construction shown in Figs. 23 and 24, which illustrates the connections between the stop-spindle and the finder-spindle, said parts are made as follows: U designates a spindle which carries at its lower end an adjustable stop-arm $u$ and is rotatively mounted in the upper wall of the camera-box. V designates the finder-spindle, carrying at its upper end the finder-supporting plate V'. U' designates a pinion on the spindle U, $V^2$ a gear-wheel on the spindle V, and $V^3$ an intermediate pinion or idler intermeshing with said pinion U' and said gear-wheel V² and through which rotation of the shaft U is communicated to the shaft V. Said pinion U' is adapted for rotation by means of a worm-shaft W, which is mounted in bearing-lugs *w w* on the inner face of the camera-box, and which shaft is adapted to project outside of the box to be manually engaged by the operator. With this construction the finder-spindle may be rotated to any angular position desired and will be held in the adjusted position until purposely changed.

I claim as my invention—

1. The combination of a swinging lens-holder and a film-support located in the rear thereof, of a stop which limits the movement of the holder, said stop being constructed to arrest the holder at varying distances from its starting-point whereby exposures of different lengths may be made on the film.

2. The combination with a swinging lens-holder, of a stop for limiting the movement of said holder, said stop being bodily movable and constructed to be set at different points in the path of the holder to arrest the holder at varying distances from its starting-point.

3. The combination with a swinging lens-holder and a film-support which is constructed to hold the film stationary when an exposure is being made, and an adjustable stop for arresting the movement of the holder.

4. The combination with an inclosure having a curved film-support therein, of a swinging lens-holder which has movement upon an axis concentric with the film-support, and a stop located in the path of the holder which is adapted to arrest the holder at varying distances from its starting-point.

5. The combination with an inclosure, a swinging lens-holder mounted in the wall of said inclosure, and a curved film-support, of an adjustable stop for said holder constructed to arrest the holder at varying distances from its starting-point.

6. The combination with an inclosure and a swinging lens-holder therein, of an adjustable stop for said holder and means located outside the inclosure for adjusting said stop.

7. The combination with an inclosure, of a swinging lens-holder, an arm rigid with said holder, a spring-pressed latch adapted to engage said arm when the lens is in its initial or normal position, an endwise-movable rod engaging at one end said latch and projecting at its other end outside said inclosure, and an adjustable stop for arresting said holder.

8. The combination with an inclosure, of a swinging lens-holder provided with a pivotal bearing-spindle, a sleeve surrounding said spindle, a spiral spring also surrounding said spindle and attached at one end to said sleeve and at the other end with the holder or spindle, and means for manually rotating said sleeve from outside the inclosure, comprising a pinion on said sleeve, and a worm-shaft engaging said pinion and projecting from said inclosure.

9. The combination with an inclosure, of a swinging lens-holder provided with a pivotal bearing-spindle, a sleeve surrounding said spindle, a spiral spring also surrounding said spindle and attached at one end to said sleeve and at its other end to the holder or spindle, means for manually rotating said sleeve from outside the inclosure, and an adjustable stop for arresting said holder.

10. The combination with an inclosure, of a swinging lens-holder provided with a pivotal bearing-spindle, a sleeve surrounding said spindle, a spiral spring also surrounding said spindle and attached at one end to said sleeve and at the other end to the holder or spindle, and means for manually rotating said sleeve from outside the inclosure, comprising a pinion on said sleeve, and a worm-shaft engaging said pinion and projecting from said inclosure, and an adjustable stop for arresting said holder.

11. The combination with an inclosure, of a swinging lens-holder pivoted in the wall of the inclosure, and an adjustable stop for arresting said lens-holder, comprising an arm pivoted to swing in a plane parallel with the plane of movement of said holder and provided at its free end with a projection extending in the path of said holder.

12. The combination with an inclosure, of a swinging lens-holder pivoted in the wall of the inclosure, and an adjustable stop for arresting said lens-holder, comprising an arm pivoted to swing in a plane parallel with the plane of movement of said holder and provided at its free end with a projection extending into the path of said holder, and means for locking said arm in its adjusted position.

13. The combination with an inclosure, of a swinging lens-holder, a stop-arm provided at one end with a rigid endwise-movable spring-pressed spindle which projects outside of the inclosure for manual engagement therewith, and provided at its free end with a projection which extends into the path of said lens-holder.

14. The combination with an inclosure, of a swinging lens-holder, a stop-arm provided at one end with a rigid, endwise-movable, spring-pressed pivot-spindle which passes through and has bearing in the wall of the inclosure, a graduated dial-plate on the outer face of said wall, an index-pointer on said spindle coöperating with said dial and provided with a lug adapted for engagement with an aperture in said dial-plate, and a projection on the free end of said arm projecting into the path of said lens-holder.

15. The combination with an inclosure, of a swinging lens-holder, an adjustable stop therefor and a range-finder movable synchronously with said stop.

16. The combination with an inclosure, of a swinging lens-holder, an adjustable stop for arresting said lens-holder, and a movably-supported range-finder which is connected with said stop so as to be moved thereby.

17. The combination with an inclosure, of a swinging lens-holder, an adjustable stop for arresting said lens-holder, a range-finder, a movable support therefor, and gear connections between said support and adjustable stop.

18. The combination with an inclosure, of a swinging lens-holder, a stop-arm provided at one end with a pivot-spindle a projection on the other end of said arm which extends into the path of said holder, a range-finder, a support therefor provided with a rotative spindle, and gear connections between said last-mentioned spindle and the pivot-spindle of the stop-arm.

19. The combination with an inclosure, of a swinging lens-holder, and a shutter adapted, when closed, to exclude light from the lens-holder, and means for closing said shutter at different points in the path of the lens-holder.

20. The combination with an inclosure, and a swinging lens-holder therein, of a shutter and an adjustable part for operating the shutter, said parts being constructed to bring the shutter in position to exclude light passing through the holder at different points in the path of movement of the holder.

21. The combination with an inclosure, of a swinging lens-holder, a shutter on said holder, and an adjustable stop adapted for engagement with said shutter.

22. The combination with an inclosure, of a swinging lens-holder, a shutter, and adjustable means constructed to close said shutter and to arrest the holder at different points in the path of movement of the holder.

23. The combination with an inclosure, of a swinging lens-holder, a shutter, means for closing said shutter, and interlocking parts on the shutter and holder constructed to arrest the holder when the shutter is closed by engagement with a stop on the inclosure.

24. The combination with an inclosure, of a swinging lens-holder, a shutter connected with the inner part of said holder, and a stop for arresting said lens-holder and for closing said shutter.

25. The combination with an inclosure, of a swinging lens-holder, a shutter connected with the inner part of said holder, a rigid arm on said holder, an adjustable stop projecting into the path of said arm, said shutter being connected with the holder in such manner that movement of the holder will be arrested when the shutter is closed by engagement therewith of said stop-arm.

26. The combination with the swinging lens-holder of a panoramic camera, of a shutter which is constructed to be automatically opened when returned to its starting position and an adjustable stop adapted to automatically close said shutter at different points in its path of movement.

27. The combination with an inclosure, of a swinging lens-holder, and means for locking said lens-holder in an intermediate position.

28. The combination with an inclosure, of a swinging lens-holder, provided at its outer end with a removable section which carries the lens, and means for locking said holder in an intermediate position.

29. The combination with a swinging lens-holder provided with an inner removable section a removable section on the outer end of the holder which carries the lens, and means for locking the holder in an intermediate position.

30. The combination with an inclosure, of a swinging lens-holder, and means for locking said lens-holder in an intermediate position, comprising a rigid arm on said holder, and a movable plate provided with a notch adapted for engagement with said arm.

31. The combination with an inclosure, of a swinging lens-holder provided at its inner end with a removable section and means for locking said holder in an intermediate position.

32. The combination with an inclosure, of a swinging lens-holder provided at its inner end with a removable section, a shutter on said removable section, a removable section at the outer end of said holder which carries the lens, and means for locking said holder in an intermediate position.

33. The combination with an inclosure, of a swinging collapsible lens-holder, means for locking said holder in a position intermediate the limits of its movement, means for holding a strip of film in position for exposure, and a plate-holding frame in the inclosure and located in position to hold a plate for exposure when the film is removed.

34. The combination with an inclosure provided with a curved film-support, of a swinging lens-holder, means for locking said holder in an intermediate position, said curved film-support being provided centrally thereof with an opening, and a plate-holding frame in rear of said opening adapted to hold a plate in position for exposure through said opening.

35. The combination with an inclosure, a curved film-support therein, a swinging lens-holder having a removable lens-carrying section, said film-support being provided with an opening opposite said lens, and a removable plate-holder in rear of said opening.

36. The combination with an inclosure, of a swinging lens-holder, comprising a pivoted section and an outer removable section which carries the lens, said sections having pin-and-slot connection.

37. The combination with an inclosure, of a swinging lens-holder, comprising a pivoted section and an outer removable section which carries the lens, said sections having telescopic engagement, and one section being provided with an L-shaped slot and the other being provided with a pin adapted for engagement with said slot.

38. The combination with a camera comprising an inclosure, and a lens-holder which is capable of oscillatory movement and which may be locked in an intermediate position between its limits of movement, of means within the inclosure for separately exposing a film-strip and a plate.

39. The combination with an inclosure, of a swinging lens-holder, means for locking the holder in an intermediate position, means for holding a strip of film in position for exposure, and a plate-holding frame located in position to hold a plate for exposure when the film is removed.

40. The combination with a swinging lens-holder of a stop therefor, a range-finder movable synchronously with said stop, and a pointer movable with the finder adapted to coöperate with a scale on the camera.

41. In a panoramic camera, the combination with an oscillatory lens-holder, of an adjustable stop for limiting the movement of the holder, means for adjusting said stop, and an indicator for determining the length of film unwound.

In testimony that I claim the foregoing as my invention I affix my signature, in presence of two witnesses, this 25th day of July, A. D. 1899.

PETER N. ANGSTEN.

Witnesses:
F. REUSCHLEIN,
J. S. GINDICE.